(12) United States Patent
Behnen et al.

(10) Patent No.: US 9,361,137 B2
(45) Date of Patent: Jun. 7, 2016

(54) MANAGING APPLICATION PARAMETERS BASED ON PARAMETER TYPES

(75) Inventors: Marion Behnen, Austin, TX (US);
Sameer V. Jorapur, Santa Clara, CA (US); Sriram Srinivasan, Sunnyvale, CA (US); Muthukumar Thirunavukkarasu, Mt. View, CA (US); Cheung-Yuk Wu, Milpitas, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1443 days.

(21) Appl. No.: 11/548,632

(22) Filed: Oct. 11, 2006

(65) Prior Publication Data

US 2008/0147703 A1    Jun. 19, 2008

(51) Int. Cl.
G06F 9/44 (2006.01)
G06F 9/445 (2006.01)
G06Q 10/06 (2012.01)

(52) U.S. Cl.
CPC .............. *G06F 9/44505* (2013.01); *G06F 8/71* (2013.01); *G06F 8/00* (2013.01); *G06Q 10/06* (2013.01)

(58) Field of Classification Search
USPC .................................................. 717/120–123
See application file for complete search history.

(56) References Cited

U.S. PATENT DOCUMENTS

| | | | |
|---|---|---|---|
| 4,813,013 A | 3/1989 | Dunn | |
| 4,901,221 A | 2/1990 | Kodosky et al. | |
| 5,379,423 A * | 1/1995 | Mutoh et al. | |
| 5,497,500 A | 3/1996 | Rogers et al. | |
| 5,577,253 A | 11/1996 | Blickstein | |
| 5,586,328 A | 12/1996 | Caron et al. | |
| 5,729,746 A * | 3/1998 | Leonard | 717/101 |
| 5,758,160 A | 5/1998 | McInerney et al. | |
| 5,850,548 A | 12/1998 | Williams | |
| 5,857,180 A | 1/1999 | Hallmark et al. | |
| 5,920,721 A | 7/1999 | Hunter et al. | |
| 5,940,593 A | 8/1999 | House et al. | |
| 5,966,532 A | 10/1999 | McDonald et al. | |
| 6,014,670 A | 1/2000 | Zamanian et al. | |
| 6,044,217 A | 3/2000 | Brealey et al. | |
| 6,098,153 A | 8/2000 | Fuld et al. | |
| 9,707,504 | 11/2000 | Banavar et al. | |
| 6,202,043 B1 * | 3/2001 | Devoino et al. | 703/17 |
| 6,208,345 B1 | 3/2001 | Sheard et al. | |
| 6,208,990 B1 | 3/2001 | Suresh et al. | |
| 6,243,710 B1 | 6/2001 | DeMichiel et al. | |
| 6,282,699 B1 | 8/2001 | Zhang et al. | |

(Continued)

OTHER PUBLICATIONS

Arusinski et al., "A Software Port from a Standalone Communications Management Unit to an Integrated Platform", 2002, IEEE, pp. 1-9.

(Continued)

*Primary Examiner* — Matthew Brophy
(74) *Attorney, Agent, or Firm* — Patterson + Sheridan, LLP

(57) ABSTRACT

Methods, computer program products, and system for managing a parameter of an application are provided. In one implementation, the method includes identifying a plurality of phases associated with the application, in which each phase corresponds to a time period during a lifecycle of the application. The method further includes defining a range of phases among the plurality of phases associated with the application during which a value of the parameter can be changed.

23 Claims, 5 Drawing Sheets

(56) References Cited

U.S. PATENT DOCUMENTS

| | | | |
|---|---|---|---|
| 6,434,739 B1 | 8/2002 | Branson et al. | |
| 6,449,619 B1 | 9/2002 | Colliat et al. | |
| 6,480,842 B1 | 11/2002 | Agassi et al. | |
| 6,604,110 B1 | 8/2003 | Savage et al. | |
| 6,668,253 B1 | 12/2003 | Thompson et al. | |
| 6,687,735 B1* | 2/2004 | Logston | G06F 8/64 370/486 |
| 6,738,964 B1 | 5/2004 | Zink et al. | |
| 6,772,409 B1 | 8/2004 | Chawla et al. | |
| 6,795,790 B1* | 9/2004 | Lang et al. | 702/123 |
| 6,807,651 B2 | 10/2004 | Saluja et al. | |
| 6,839,724 B2 | 1/2005 | Manchanda et al. | |
| 6,839,726 B2 | 1/2005 | Kawamoto | |
| 6,850,925 B2 | 2/2005 | Chaudhuri et al. | |
| 6,928,431 B2 | 8/2005 | Dettinger et al. | |
| 6,968,326 B2 | 11/2005 | Johnson et al. | |
| 6,968,335 B2 | 11/2005 | Bayliss | |
| 6,978,270 B1 | 12/2005 | Carty et al. | |
| 7,003,560 B1 | 2/2006 | Mullen et al. | |
| 7,010,779 B2 | 3/2006 | Rubin et al. | |
| 7,031,987 B2 | 4/2006 | Mukkamalla et al. | |
| 7,035,786 B1* | 4/2006 | Abu El Ata et al. | 703/21 |
| 7,076,765 B1 | 7/2006 | Omori | |
| 7,103,590 B1 | 9/2006 | Murthy et al. | |
| 7,191,183 B1 | 3/2007 | Goldstein | |
| 7,209,925 B2 | 4/2007 | Srinivasan et al. | |
| 7,272,815 B1* | 9/2007 | Eldridge | G06F 8/71 707/999.009 |
| 7,340,718 B2 | 3/2008 | Szladovics et al. | |
| 7,343,585 B1 | 3/2008 | Lau et al. | |
| 7,493,311 B1 | 2/2009 | Cutsinger et al. | |
| 7,499,917 B2 | 3/2009 | Purcell et al. | |
| 7,526,468 B2 | 4/2009 | Vincent et al. | |
| 7,689,576 B2 | 3/2010 | Rao et al. | |
| 7,689,582 B2 | 3/2010 | Behnen et al. | |
| 7,739,267 B2 | 6/2010 | Jin et al. | |
| 7,747,563 B2 | 6/2010 | Gehring | |
| 7,810,067 B2* | 10/2010 | Kaelicke et al. | 717/102 |
| 7,860,863 B2 | 12/2010 | Bar-Or et al. | |
| 7,895,639 B2* | 2/2011 | Spataro | G06F 21/604 713/167 |
| 7,941,460 B2 | 5/2011 | Bar-Or et al. | |
| 8,230,384 B1 | 7/2012 | Krishnan et al. | |
| 8,839,724 B2 | 9/2014 | Allen et al. | |
| 8,903,762 B2 | 12/2014 | Jin et al. | |
| 2002/0046301 A1 | 4/2002 | Shannon et al. | |
| 2002/0066077 A1* | 5/2002 | Leung | 717/126 |
| 2002/0078262 A1 | 6/2002 | Harrison et al. | |
| 2002/0116376 A1 | 8/2002 | Iwata et al. | |
| 2002/0162090 A1* | 10/2002 | Parnell et al. | 717/120 |
| 2002/0170035 A1 | 11/2002 | Casati et al. | |
| 2002/0198872 A1 | 12/2002 | MacNicol et al. | |
| 2003/0033437 A1 | 2/2003 | Fischer et al. | |
| 2003/0037322 A1 | 2/2003 | Kodesky et al. | |
| 2003/0051226 A1 | 3/2003 | Zimmer et al. | |
| 2003/0100198 A1 | 5/2003 | Hicks et al. | |
| 2003/0101098 A1 | 5/2003 | Schaarschmidt | |
| 2003/0110470 A1 | 6/2003 | Hanson et al. | |
| 2003/0149556 A1 | 8/2003 | Riess | |
| 2003/0154274 A1 | 8/2003 | Nakamura | |
| 2003/0172059 A1 | 9/2003 | Andrei | |
| 2003/0182651 A1 | 9/2003 | Secrist et al. | |
| 2003/0229639 A1 | 12/2003 | Carlson et al. | |
| 2003/0233374 A1 | 12/2003 | Spinola et al. | |
| 2003/0236788 A1* | 12/2003 | Kanellos et al. | 707/100 |
| 2004/0054684 A1 | 3/2004 | Geels | |
| 2004/0068479 A1 | 4/2004 | Wolfson et al. | |
| 2004/0073886 A1* | 4/2004 | Irani | 717/101 |
| 2004/0107414 A1 | 6/2004 | Bronicki et al. | |
| 2004/0143811 A1* | 7/2004 | Kaelicke et al. | 717/101 |
| 2004/0220923 A1 | 11/2004 | Nica | |
| 2004/0254948 A1 | 12/2004 | Yao | |
| 2005/0022157 A1* | 1/2005 | Brendle et al. | 717/104 |
| 2005/0044527 A1 | 2/2005 | Recinto | |
| 2005/0055257 A1 | 3/2005 | Senturk et al. | |
| 2005/0066283 A1 | 3/2005 | Kanamaru | |
| 2005/0091664 A1 | 4/2005 | Cook et al. | |
| 2005/0091684 A1 | 4/2005 | Kawabata et al. | |
| 2005/0097103 A1 | 5/2005 | Zane et al. | |
| 2005/0108209 A1 | 5/2005 | Beyer et al. | |
| 2005/0131881 A1 | 6/2005 | Ghosh et al. | |
| 2005/0137852 A1 | 6/2005 | Chari et al. | |
| 2005/0149914 A1 | 7/2005 | Krapf et al. | |
| 2005/0174986 A1 | 8/2005 | Emond et al. | |
| 2005/0174988 A1 | 8/2005 | Bieber et al. | |
| 2005/0187935 A1* | 8/2005 | Kumar | G06F 17/30306 |
| 2005/0188353 A1 | 8/2005 | Hasson et al. | |
| 2005/0216497 A1 | 9/2005 | Kruse et al. | |
| 2005/0227216 A1 | 10/2005 | Gupta | |
| 2005/0234969 A1 | 10/2005 | Mamou et al. | |
| 2005/0240354 A1 | 10/2005 | Mamou et al. | |
| 2005/0240652 A1 | 10/2005 | Crick | |
| 2005/0243604 A1 | 11/2005 | Harken et al. | |
| 2005/0256892 A1 | 11/2005 | Harken | |
| 2005/0283473 A1 | 12/2005 | Rousso et al. | |
| 2006/0004863 A1 | 1/2006 | Chan et al. | |
| 2006/0015380 A1* | 1/2006 | Flinn et al. | 705/7 |
| 2006/0036522 A1 | 2/2006 | Perham | |
| 2006/0047709 A1 | 3/2006 | Belin et al. | |
| 2006/0066257 A1 | 3/2006 | Chou | |
| 2006/0074621 A1* | 4/2006 | Rachman | 703/22 |
| 2006/0074730 A1 | 4/2006 | Shukla et al. | |
| 2006/0101011 A1 | 5/2006 | Lindsay et al. | |
| 2006/0112109 A1 | 5/2006 | Chowdhary et al. | |
| 2006/0123067 A1 | 6/2006 | Ghattu et al. | |
| 2006/0167865 A1 | 7/2006 | Andrei | |
| 2006/0174225 A1 | 8/2006 | Bennett et al. | |
| 2006/0206869 A1 | 9/2006 | Lewis et al. | |
| 2006/0212475 A1 | 9/2006 | Cheng | |
| 2006/0218123 A1 | 9/2006 | Chowdhuri et al. | |
| 2006/0228654 A1 | 10/2006 | Sanjar et al. | |
| 2007/0061305 A1 | 3/2007 | Azizi | |
| 2007/0078812 A1 | 4/2007 | Waingold et al. | |
| 2007/0157191 A1 | 7/2007 | Seeger et al. | |
| 2007/0169040 A1 | 7/2007 | Chen | |
| 2007/0203893 A1 | 8/2007 | Krinsky et al. | |
| 2007/0208721 A1 | 9/2007 | Zaman et al. | |
| 2007/0214111 A1 | 9/2007 | Jin et al. | |
| 2007/0214171 A1 | 9/2007 | Behnen et al. | |
| 2007/0214176 A1 | 9/2007 | Rao et al. | |
| 2007/0244876 A1 | 10/2007 | Jin et al. | |
| 2007/0244976 A1 | 10/2007 | Carroll et al. | |
| 2008/0092112 A1 | 4/2008 | Jin et al. | |
| 2008/0127040 A1* | 5/2008 | Barcellona | G06F 8/10 717/101 |
| 2008/0147703 A1 | 6/2008 | Behnen et al. | |
| 2008/0147707 A1 | 6/2008 | Jin et al. | |
| 2008/0168082 A1 | 7/2008 | Jin et al. | |

OTHER PUBLICATIONS

Carreira et al., "Execution of Data Mappers", IQIS, 2004, pp. 2-9, 2004 ACM 1-58113-902-0/04/0006, Paris, France.

Carreira et al., "Data Mapper: An Operator for Expressing One-to Many Data Transformations", Data Warehousing and Knowledge Discovery, Tjoa et al, editors, 7th International Conference DaWaK 2005 Copenhagen, Denmark, Aug. 22-26, 2005, pp. 136-145.

Ferguson et al., "Platform Independent Translations for a Compilable Ada Abstract Syntax", Feb. 1993 ACM 0-89791-621-2/93/0009-0312 1.50, pp. 312-322.

Friedrich, II, Meta-Data Version and Configuration Management in Multi-Vendor Environments, SIGMOD, Jun. 14-16, 2005, 6 pgs., Baltimore, MD.

Gurd et al., "The Manchester Prototype Dataflow Computer", Communications of the ACM, Jan. 1985, pp. 34-52, vol. 28, No. 1.

Hernandez et al., "Clio: A schema mapping tool for information integration", IEEE Computer Society, 2005.

Haas et al., "Clio Grows Up: From Research Prototype to Industrial Tool", SIGMOD, Jun. 14-16, 2005, 6 pgs., Baltimore, MD.

Jardim-Gonçalves et al., "Integration and adoptability of APs: the role of ISO TC184/SC4 standards", International Journal of Computer Applications in Technology, 2003, pp. 105-116, vol. 18, Nos. 1-4.

(56) References Cited

OTHER PUBLICATIONS

Poess et al., "TPC-DS, Taking Decision Support Benchmarking to the Next Level", ACM SIGMOD, Jun. 4-6, 2002, 6 pgs., Madison, WI.

Ramu, "Method for Initializing a Plateform and Code Independent Library", IBM Technical Disclosure Bulletin, Sep. 1994, pp. 637-638, vol. 37, No. 9.

Rafaieh et al., "Query-based data warehousing tool", DOLAP, Nov. 8, 2002, 8 pgs., McLean, VA.

Simitsis, "Mapping Conceptual to Logical Models for ETL Processes", ACM Digital Library, 2005, pp. 67-76.

Stewart et al., "Dynamic Applications from the Ground Up", Haskell '05, Sep. 30, 2005, Tallinn, Estonia, ACM, pp. 27-38.

Vassiliadis et al., "A generic and customizable framework for the design of ETL scenarios", Information Systems, Databases: Creation, Management and Utilization, 2005, pp. 492-525, vol. 30, No. 7.

Werner et al., "Just-in-sequence material supply—a simulation based solution in electronics", Robotics and Computer-Integrated Manufacturing, 2003, pp. 107-111, vol. 19, Nos. 1-2.

Yu, "Transform Merging of ETL Data Flow Plan", IKE '03 International Conference, 2003, pp. 193-198.

Zhao et al., "Automated Glue/Wrapper Code Generation in Integration of Distributed and Heterogeneous Software Components", Proceedings of the 8th IEEE International Enterprise Distributed Object Computing Conf. (EDOC 2004), 2004, IEEE, pp. 1-11.

Method and Apparatus for Modelling Data Exchange in a Data Flow of an Extract, Transform, and Load (ETL) Process, SVL90060126US1, U.S. Appl. No. 11/621,521, filed Jan. 9, 2007.

Tjoa, et al. (Eds.), "Data Warehousing and Knowledge Discovery—Data Mapper: An Operator for Expressing One-to-Many Data Transformations," Proceedings of 7th International Conference, DaWaK 2005, Copenhagen, Denmark, Aug. 22-26, 2005, 12 pages.

Konstantinides, et al., "The Khoros Software Development Environment for Image and Signal Processing," May 1994, IEEE, vol. 3, pp. 243-252.

"Method and system for generating data flow execution components in heterogeneous data integration environments", U.S. Appl. No. 11/372,540, filed Mar. 10, 2006.

"Dilation of sub-flow operations in a data flow", U.S. Appl. No. 11/372,516, filed Mar. 10, 2006.

"Classification and sequencing of mixed data flows", U.S. Appl. No. 11/373,084, filed Mar. 10, 2006.

"Data flow system and method for heterogeneous data integration environments", U.S. Appl. No. 11/373,685, filed Mar. 10, 2006.

Ives, Zachary E, et al.; "An Adaptive Query Execution System for Data Integration"; Jun. 1999; pp. 299-310; vol. 28, Issue 2; ACM, New York, New York, USA.

\* cited by examiner

MANAGING APPLICATION PARAMETERS BASED ON PARAMETER TYPES

CROSS-REFERENCE TO RELATED APPLICATIONS

This application is related to U.S. patent application entitled "Data Flow System and Method For Heterogeneous Data Integration Environments," Ser. No. 11/373,685, filed on Mar. 10, 2006, which is incorporated by reference herein.

FIELD OF THE INVENTION

The present invention relates generally to data processing, and more particularly to managing parameters associated with an application.

BACKGROUND OF THE INVENTION

In many data processing applications—e.g., data integration or Extract, Transform, Load (ETL) processes—execution of jobs commonly involves use of parameters (or variables) as arguments for specific invocations of a job. Parameters includes, for example, frequently changing values such as a password for a database connection, or performance tuning values (e.g., "maximum number of threads"). Parameters can even include specific semantic variations in a job such as a "date range" parameter (e.g., "between (Jan. 1, 2001, Jan. 1, 2006)"). Generally the values of parameters (or variables) are changed depending upon various circumstances; for example, for daily runs of a particular job (e.g., a report for "date range"), or for rare occurrences (like changing the URL of a database, if the database has been moved). Typically, there are also programmatic interfaces that may be used to automatically set the values of some parameters, for example, "today's date".

Typically, to manage the development and administration of complex data processing applications, the lifecycle of such data processing applications are loosely organized into phases. Examples of phases include a design (or development) phase (during which each component or job of an application is modeled or coded), a deployment preparation phase (during which the components of an application are uniquely identified and configured, compiled or built, the total set of database resources are identified, and so on), a packaging (or assembly) phase (during which an application installing package is assembled, including all code, shared libraries, and configuration files), a deployment (or install) phase (during which the application package is installed onto a data processing runtime environment, and resource references are mapped to live resources), an administration phase (during which deployed jobs may be configured or administered), and an execution instance phase (during which instances of deployed jobs are executed). During each phase, different users are generally involved—e.g., during the design phase, software programmers develop specific components or jobs, while during the administration phase, administrators typically deploy and monitor applications and jobs in the production runtime environment.

Due to the large number of parameters that are typically involved in large enterprise data processing applications, not every user may have a sufficient semantic understanding about each job and the parameters associated with each job, especially since there are usually multiple different users involved in the different stages of an application's development. For example, an administrator who executes a specific job may not be aware of the specific semantics associated with the setting of a particular parameter value. Thus, as a result, only the most common or well understood parameters (such as "password") are the only parameters implemented within a job. Generally, there is also no easy way to determine the effect of a change in the value of a parameter at any point in the lifecycle of a job in a data processing application. For example, changing a parameter that was previously assigned the name of a particular database table could significantly affect an entire application. In general, there also is not a standard way to restrict when the value of a parameter can be safely changed.

BRIEF SUMMARY OF THE INVENTION

In general, in one aspect, this specification describes a computer-implemented method for managing a parameter of an application. The method includes identifying a plurality of phases associated with the application, in which each phase conesponds to a time period during a lifecycle of the application. The method further includes defining a range of phases among the plurality of phases associated with the application during which a value of the parameter can be changed.

Implementations can include one or more of the following features. Identifying a plurality of phases can include receiving user input identifying the plurality of phases associated with the application or include identifying the plurality of phases associated with the application based on pre-defined settings. Defining a range of phases associated with the application during which a value of the parameter can be changed can be based on a parameter type associated with the parameter. The plurality of phases associated with the application can comprise one or more of a design phase, a deployment preparation phase, a packaging phase, a deployment phase, an administration phase, or an execution instance phase. The method can further include defining an attribute of the parameter. The attribute can be indicative of one of the following: whether the parameter is useable among different jobs of an application; that the value of the parameter is not changeable or is for meant for display purposes only; whether the parameter requires a valid current value; each job where the parameter is referenced; or a group to which the parameter belongs.

In general, in another aspect, this specification describes a computer-implemented method for managing a parameter of an application. The method includes receiving a request to change a value of a parameter associated with the application, and determining a current phase associated with the application. The current phase corresponds to a time period during a lifecycle of the application. The method further includes changing the value of the parameter if the current phase is within a permissible range of phases during which the value of the parameter can be changed.

Implementations can include one or more of the following features. The permissible range of phases can include one or more of a design phase, a deployment preparation phase, a packaging phase, a deployment phase, an administration phase, or an execution instance phase. The permissible range of phases during which the value of the parameter can be changed can be defined by a user.

In general, in another aspect, this specification describes a computer program product, tangibly stored on a computer-readable medium, for managing a parameter of an application. The computer program product comprising instructions for causing a programmable processor to identify a plurality of phases associated with the application, in which each phase corresponds to a time period during a lifecycle of the application. The computer program product further comprises instructions for causing a programmable processor to define a range of phases among the plurality of phases associated with the application during which a value of the parameter can be changed.

In general, in another aspect, this specification describes a computer program product, tangibly stored on a computer-readable medium, for managing a parameter of an application. The computer program product comprising instructions for causing a programmable processor to receive a request to change a value of a parameter associated with the application, and determine a current phase associated with the application. The current phase corresponds to a time period during a lifecycle of the application. The computer program product further comprises instructions for causing a programmable processor to change the value of the parameter if the current phase is within a permissible range of phases during which the value of the parameter can be changed.

Implementations can provide one or more of the following advantages. In one aspect, the concept of phases (or stages) in the development life cycle of a data processing application are used to show only a specific set of parameters that pertains to a specific user action at any given time, add semantics to enforce the safe changing of parameter values, and allow specific users (at the right stages in the development lifecycle) to decide whether individual parameters can be changed and when the parameters can be changed for a final time (e.g., by setting a "maxChangePhase" attribute of a parameter, as discussed below). Additionally, the concept of sharing of parameters discussed below provides richer mechanisms to enforce editing semantics as well as specialized overriding of some semantics. Further, the concept of parameter usage references discussed below provides better feedback for users to evaluate the effect of changing a value of a shared parameter, and the concept of parameter groups can be used together with phase values to provide focused sets of parameters as well as provide "virtual" groups to show additional information to a user.

In general, in another aspect, this specification describes a computer-implemented method for managing a parameter of an application. The method includes determining a group associated with a user of the application, and displaying a parameter that is associated with the group to the user. The parameter is associated with a defined range of phases of the application during which the value of the parameter can be changed.

In general, in another aspect, this specification describes a computer program product, tangibly stored on a computer-readable medium, for managing a parameter of an application. The computer program product comprises instructions for causing a programmable processor to determine a group associated with a user of the application, and display a parameter that is associated with the group to the user. The parameter is associated with a defined range of phases of the application during which the value of the parameter can be changed.

In general, in another aspect, this specification describes a system for managing a parameter of an application. The system includes a first component to determine a group associated with a user of the application, and a second component to display a parameter that is associated with the group to the user. The parameter is associated with a defined range of phases of the application during which the value of the parameter can be changed. The first component and the second component can form a parameter handing component of the system.

The details of one or more implementations are set forth in the accompanying drawings and the description below. Other features and advantages will be apparent from the description and drawings.

BRIEF DESCRIPTION OF THE DRAWINGS

Like reference symbols in the various drawings indicate like elements.

DETAILED DESCRIPTION OF THE INVENTION

The present invention relates generally to data processing, and more particularly to restricting the scope of parameters associated with data processing applications. The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

Figure 1:
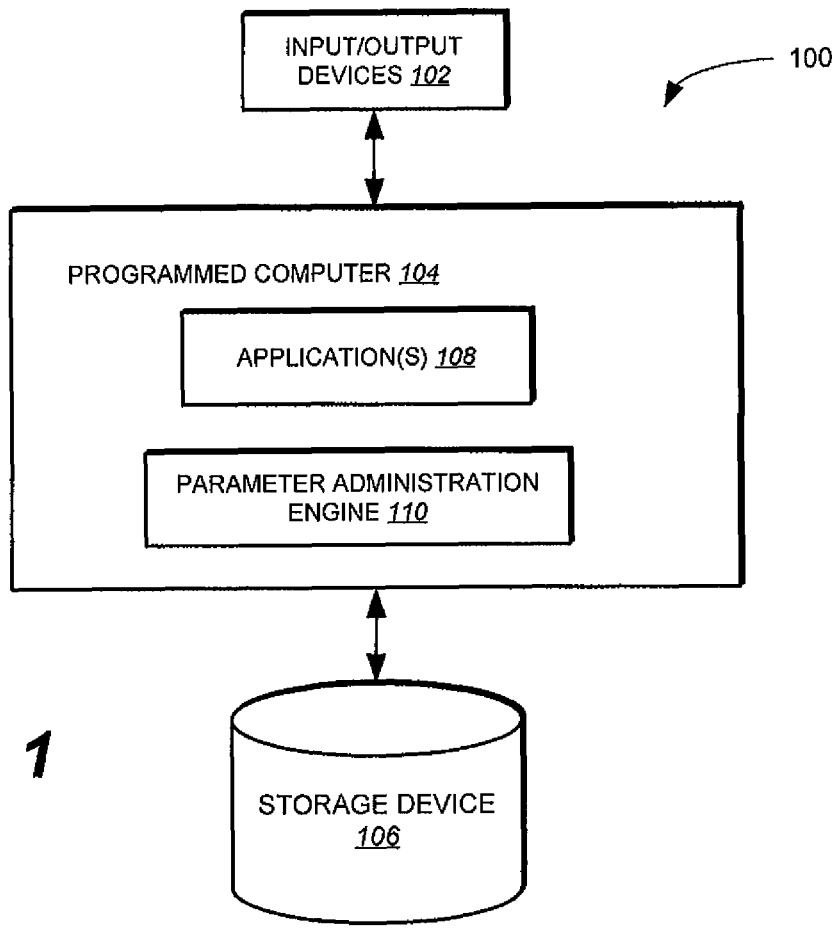
FIG. 1 is a block diagram of a data processing system including a parameter handling component in accordance with one implementation of the invention.

FIG. 1 illustrates a data processing system 100 in accordance with one implementation of the invention. The data processing system 100 can comprise the IBM DB2 Data Warehouse Edition (DWE) product available from International Business Machines Corporation of Armonk, N.Y. Data processing system 100 includes input and output devices 102, a programmed computer 104, and a storage device 106. Input and output devices 102 can include devices such as a printer, a keyboard, a mouse, a digitizing pen, a display, a printer, and the like. Programmed computer 104 can be any type of computer system, including for example, a workstation, a desktop computer, a laptop computer, a personal digital assistant (PDA), a cell phone, a network, and so on.

Figure 3:
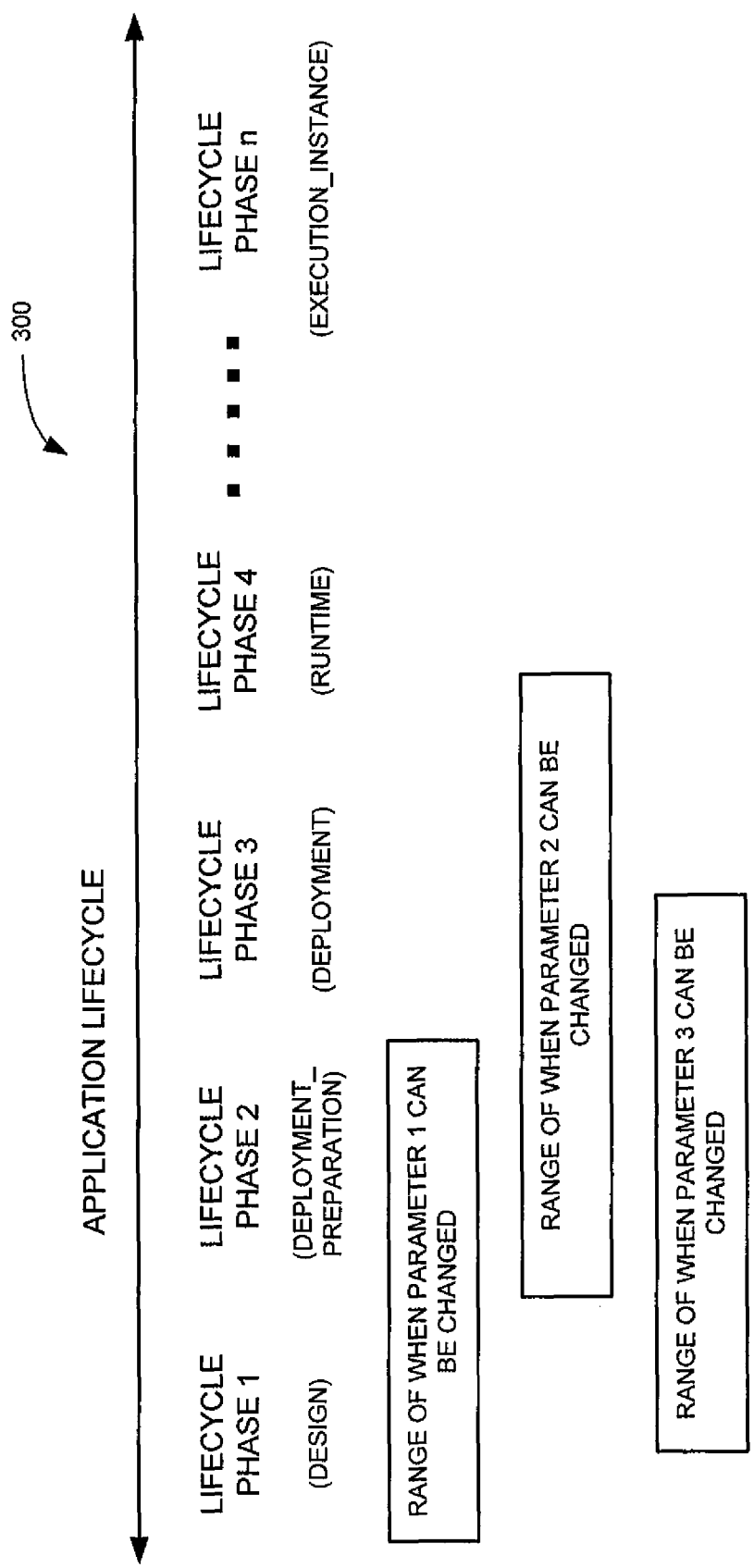
FIG. 3 illustrates a graph of an example lifecycle of an application in accordance with one implementation of the invention.

Running on the programmed computer 104 are one or more application(s) 108 (e.g., data processing applications) and a parameter administration component 110. In one implementation, the programmed computer 104 includes a graphical user interface (GUI) (not shown) that permits users to manage the development and administration of the application(s) 108 throughout the lifecycle of the application(s) 108. FIG. 3 illustrates a graph 300 that includes example phases in the lifecycle of an application. The phases include a design phase, a deployment preparation phase, a deployment phase, a runtime phase, and an execution instance phase. Note that even though the identification of phases is fairly common, for different data processing environments or for different software development methodologies, there could be additional phases (or lesser) or differently named phases in the lifecycle of a given application. The discussion herein applies generically to any kind of phase or stage nomenclature in an application's lifecycle. The parameter administration component 110 generally manages parameters associated with the application(s) 108.

In one implementation, the parameter administration component 110 uses specific phases of an application lifecycle to manage parameters associated with an application, including defining a range of phases during which a value of a given parameter can be changed and when the parameters (safely) may not be changed, as discussed in greater detail below. For example, as shown in the graph 300, the range of phases during which a value associated with parameter 1 can be changed spans from lifecycle phase 1 (e.g., design phase) though lifecycle phase 2 (e.g., deployment preparation phase). The range of phases during which a value associated with parameter 2 can be changed spans from lifecycle phase 2 through a portion of lifecycle phase 4 (e.g., runtime phase). The range of phases during which a value associated with parameter 3 can be changed spans from lifecycle phase 1 through a portion of lifecycle phase 3 (e.g., deployment phase). More generally, the range of phases during which a value of a given parameter can be changed can span at least a portion of one or more phases associated with an application.

Figure 2:
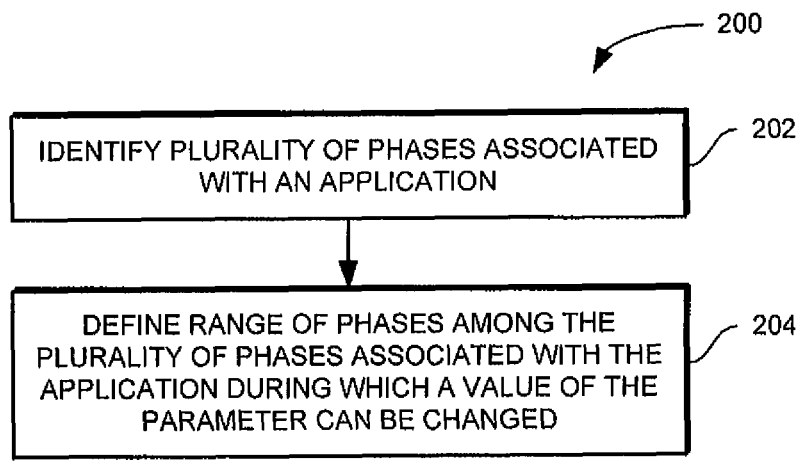
FIG. 2 is a flow diagram of a method for managing a parameter of an application based on phases in accordance with one implementation of the invention.

FIG. 2 is a flow diagram illustrating a computer-implemented method 200 for managing the scope of a parameter (associated with an application) based on lifecycle phases of the application. The method 200 begins with the data processing system 100 identifying phases associated with an application (step 202). In one implementation, each phase corresponds to a time period during the lifecycle of the application. In one implementation, each time period is a distinct time period, in which no one time period overlaps with another time period. In another implementation, one or more of the time periods overlap. The data processing system 100 can identify the phases associated with the application lifecycle based on user input. For example, in one implementation, individual members of an application development and administration team can identify phases during which the changing of a parameter's value is safe and convenient, and accordingly input such information into the data processing system 100. Alternatively, the data processing system 100 can identify (or determine) the phases during which the value of a parameter can be changed based on pre-defined settings. In one implementation, only a subset of the phases of the application lifecycle are identified—e.g., those phases in which a parameter is either chosen (or selected) or where a parameter's value is changed. The identified phases can be associated with a value—e.g., the following phase enumeration can be implemented within the data processing system 100—{0: DESIGN, 1: DEPLOYMENT_PREPARATION, 2: DEPLOYMENT, 3: RUNTIME, 4: EXECUTION_INSTANCE}. In one implementation, the value of each phase can be associated with a corresponding parameter as an attribute (e.g., maxChangePhase) of the parameter, as discussed in greater detail below.

Once the data processing system 100 has identified the phases associated with the lifecycle of a given application, the parameter administration component 110 defines a range of phases among the identified phases during which a value of the parameter can be changed (step 204). As discussed above, the range of phases during which a value of a parameter can be changed can span at least a portion of one or more phases associated with an application (as shown in FIG. 3). For example, a parameter that represents a database schema name ("SchemaName") of a given job may not be changeable safely after a particular phase—e.g., the deployment phase—since there may be additional operations (once-only jobs) that may have been run to prepare a particular schema for the job. Should the user change this parameter's value to another schema name, then the results of executing the job would be unpredictable. In one implementation, the parameter administration component 110 further restricts when parameters can be changed based on a particular user's role—e.g., an administrator will generally have greater understanding of parameter management than an end-user and, therefore, the parameter administration component 10 can permit an administrator to change a value of a parameter while restricting an end-user from changing the same parameter value (within the same lifecycle phase).

Parameter Data Structure

Data processing or integration systems typically have a parameter (or variable) data structure. Parameter data structures commonly include the following attributes shown in Table 1 below.

TABLE 1

| Attribute | Definition |
| --- | --- |
| id | a unique identifier, usually system-assigned |
| label | a descriptive tag, user-assigned |
| comments | user modifiable, typically to indicate purpose of parameter |
| type | permitted type for value to indicate what kind of value is permissible, e.g., string, date, integer, file |
| value | current value assigned to parameter |

Some systems also have additional attributes or operations associated with parameter data structures—for example, a "validRange" attribute (to identify which values are permitted for the parameter), or a "validator" method reference (either selected from a library of routines or user-provided) that validates a value that is entered for the parameter.

In one implementation, the data processing system 100 (FIG. 1) further permits one or more of the following attributes to be added to the data structure of parameters shown in Table 2 below.

TABLE 2

| Attribute | Definition |
| --- | --- |
| readOnly | identifies that the parameter's value may not be changed, or is meant for display/informational purposes only |
| maxChangePhase | value of attribute corresponds to last phase during which parameter value can be changed |
| defaultValue | an optional user-assigned value, which is selected if the current value of the parameter is null, or empty, or if the current value is somehow invalid |
| required | an optional field set by user to indicate whether the parameter requires a valid current value |

TABLE 2-continued

| Attribute | Definition |
| --- | --- |
| allowSharing | indicates whether the parameter may be used in different locations, e.g., in different jobs |
| usedIn | used to keep track of the different jobs (and places inside the jobs) where the parameter is referenced - for example, if allowSharing is false, then there would only be one, if any, place where the parameter is used |
| groups | permits parameters to be categorized into one or more groups |

Figure 6:
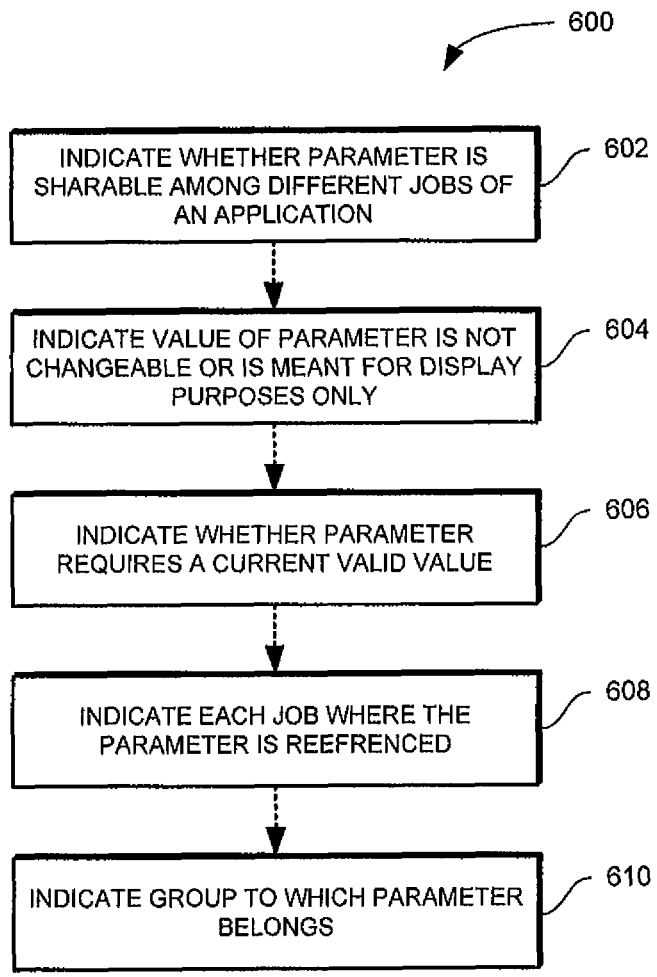
FIG. 6 illustrates various indications of an attribute associated with a parameter in accordance with one implementation of the invention.

For example, developers of jobs can set the "maxChangeValue" of a given parameter to enforce the notion that the value of the parameter should not be changed beyond a specified phase. So, for the example discussed above, a developer could set the "maxChangeValue" for the "SchemaName" parameter to be "Deployment" phase (e.g., a value of "2"), meaning that the last time that the parameter's value can be changed is, e.g., during the deployment of the application to the production system. For example, in the data processing system 100, the parameter administration component 110 (or other administration component) would not permit users to change (or alter) the "SchemaName" parameter (referring to the example above) when executing jobs, since the current phase would be "EXECUTION_INSTANCE" which is beyond (or numerically greater according to the phase enumeration listed above than) the "DEPLOYMENT" phase assigned to the "maxChangePhase" attribute of the "SchemaName" parameter. FIG. 6 illustrates various indications 600 of an attribute associated with a parameter in accordance with one implementation of the invention. The indications include whether a parameter is sharable among different jobs of an application (602), that the value of the parameter is not changeable or is for meant for display purposes only (604), whether the parameter requires a valid current value (606), each job where the parameter is referenced (608) or a group to which the parameter belongs (610). Groups are discussed in greater detail below.

Figure 4:
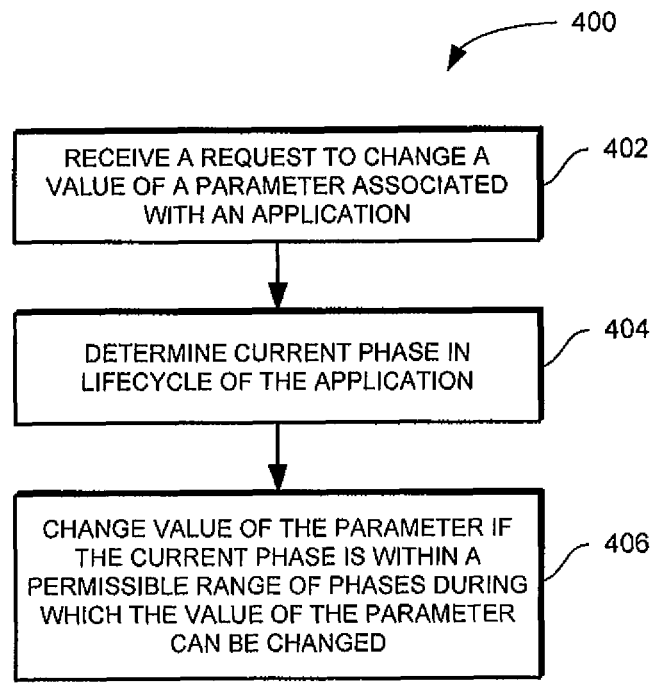
FIG. 4 is a flow diagram of a method for managing a parameter of an application based on phases in accordance with one implementation of the invention.

FIG. 4 illustrates a method 400 for managing a parameter of an application in accordance with one implementation of the present invention. A request is received to change a value of a parameter associated with an application (step 402). The request can be received from a user through a graphical user interface, or from an application. The parameter can be a parameter associated with, e.g., an ETL job. A determination is made (e.g., by parameter administration component 110) of the current phase in the lifecycle of the application (step 404). In one implementation, the current phase is maintained by an object within the data processing system. A determination is further made (e.g., by parameter administration component 110) whether the current phase in the lifecycle of the application is within a permissible range of phases during which the value of the parameter can be changed. If the current phase is within a permissible range of phases during which the value of the parameter can be changed, then the value of the parameter is changed (in accordance with the request) (step 406).

An advantage of using phases to restrict when changes (or edits) can be made to values of parameters is that the number of parameters available for a user (i.e., only those parameters that the user can edit) can be significantly reduced. Optionally, the parameters that are not available for a user (i.e., those parameters that the user cannot edit), can still be presented to a user for viewing purposes only, e.g., by setting the "readOnly" attribute of such parameters to "TRUE".

Shared Parameter References

To further reduce the number of parameters associated with an application, as well as to provide very specific semantics, sharing of parameters can be introduced within jobs inside the context of an application of the data processing system 100. In one implementation, an application is composed of many different executable jobs and, accordingly, parameters may be shared between these different jobs.

Every parameter is typically uniquely designated by a corresponding identifier. Accordingly, whenever a variable value is to be used in a job, a user can usually select a parameter that is already defined or a new parameter may be created. Thus, when two different jobs refer to a particular parameter ID, then the two jobs are referring to the same parameter. This is very useful in situations, where the values that the two (or more) jobs are referencing are indeed the same. For example, a first job may be producing a file with a parameter ID "FILE_123", and a second job may need to consume the same file, and therefore the parameter reference of the second job should also be the same "FILE_123". In conventional data processing systems, in which there may be two different parameters used among two different jobs, responsibility for ensuring that values for these two different parameters are the same typically falls into the hands of an administrator (or executor of the jobs). Such reliance on an administrator is error-prone, and can be avoided by using shared parameters.

In one implementation, the data processing system 100 implements shared parameters by assigning unique identifiers (or IDs) to each parameter created by a user. In design and development environments, developers are presented (e.g., in a GUI) with an option of selecting an existing parameter (shared) or creating a new parameter. For example, in one implementation, the parameter administration component 110 includes user interfaces that permit users to add parameters for use in various data flow and control jobs. For some scenarios, developers may wish to keep a parameter unique to a particular location in which the parameter is used—i.e., to not allow the parameter to be shared. In such a case, (in one implementation) developers can set the "allowShared" attribute of the parameter to "FALSE" to inform the data processing system that the parameter can only be used at a single location. In one implementation, the data processing system restricts the scope of shared parameters based on life cycle phases of an application, as discussed in greater detail below.

Parameter Usage References

In one implementation, the sharing of a given parameter is allowed whenever the user has set the "allowShared" attribute of the parameter to "TRUE". In one implementation, when a user selects a parameter for use in a particular job, a reference to that job (or to the specific location in that job where the parameter is used) is maintained by the "usedin" attribute of the parameter. For example, in the IBM DWE system, through a data flow tool, a parameter may be assigned for the value of an operator's property and, therefore, the "usedIn"

attribute of the parameter will contain a reference to that operator property. Accordingly, any user who may change the value of the parameter can identify exactly where else the parameter is used, and determine the potential impact, if any, of changing the value of the parameter.

Generally, when executing a job, only the parameters that are specifically referenced inside of the job are needed. In addition, only the parameters that are not shared need to be displayed during execution of a job. This is because shared parameters are "global" and, therefore, should be update-able at the scope of the application as a whole and not necessarily for every job. Thus, in one implementation, to permit more flexibility for developers, parameters are attached the "EXECUTION_INSTANCE" phase scope. This phase is used as a way to indicate an exception that that particular parameter, even if shared, may be editable while executing a job. Thus, the concept of phases can be used to enrich conventional data processing systems that may rely on simple sharing of parameters to reduce the scope of parameters. For example, a "database user" parameter would be typically shared as the same user may be used in multiple jobs, however, for maximum flexibility, attaching the "EXECUTION_INSTANCE" phase will let administrators run one-off jobs with alternate user names.

Groups

In one implementation, parameters are grouped into different groups. The groups can have unique identifiers and can have different semantics depending upon application requirements. For example, each group may have unique access control lists (ACLs) to allow individual users permissions to access or change parameter values. The access control lists provide a mechanism within a data processing system to control which specific user may use or alter variables. In one implementation, to further limit the complexity of parameter management, groups are used as a means of reducing the number of variables in scope at any given time. For example, (in one implementation) developers can use "basic", "intermediate", and "advanced" groups to indicate the level of user awareness needed to alter values of parameters that are within a particular group. In one implementation, the data processing system 100 further provides "virtual" groups. For example, the data processing system 100 can provide "virtual" groups in the form of a list of "read-only" (or for display only) parameters in a "read-only" group, or a group of "global parameters", when a job is being executed (i.e., when the phase is EXECUTION_INSTANCE). Thus, only the "EXECUTION_INSTANCE" phase parameters are shown as editable for the user when executing the job, and also the parameters in a "virtual" group can be (optionally) shown to the user as well to give more information to the user (or administrator).

Parameter Type-Specific Semantics

Figure 5:
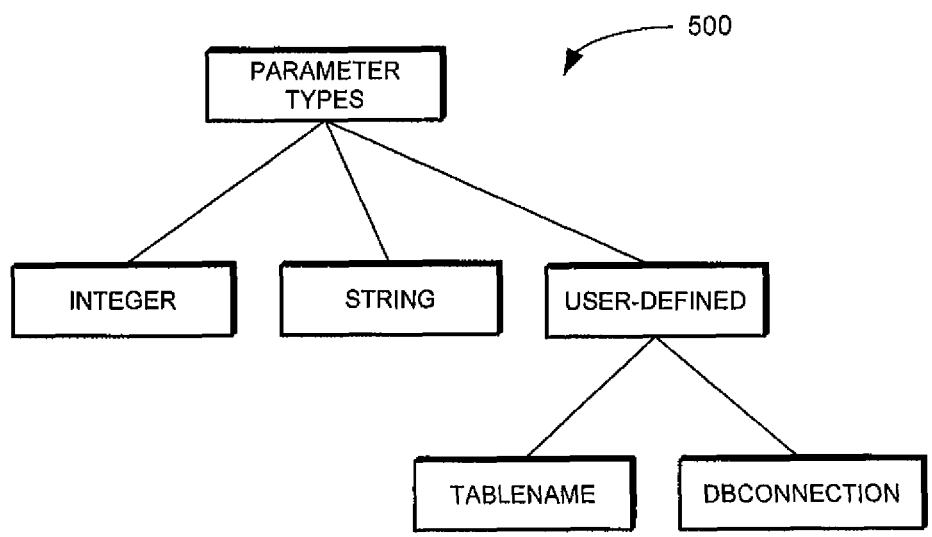
FIG. 5 is a graph of example parameter types that can be associated with a parameter in accordance with one implementation of the invention.

Parameter types are typically used to enforce the data-type of values that are permissible for a given parameter. FIG. 5 illustrates a graph 500 of example parameter types that can be associated with a parameter in accordance with one implementation of the invention. The parameter types include an integer parameter type, a string parameter type, and a user-defined parameter type. For example, the integer parameter type indicates that only integer values are allowed for the parameter. The data-type of a parameter is typically used by user interface (UI) editors or validation routines to determine if values for a parameter are allowed. In one implementation, the data processing system 100 permits users to introduce new parameter types (e.g., user-defined parameter types), so that users can generate more complex types or parameters, as well as provide better semantics for parameters. For example, in the data processing system 100, a "TableName" or "DBConnection" parameter type can be specified, where the "TableName" parameter type implies that the values of corresponding parameters refer to database table names, and the "DBConnection" parameter type implies that values of corresponding parameters can be selected from an enumeration of available database connections.

In one implementation, additional semantics can be attached to parameter types within the data processing system 100. For example, one useful semantic that can be attached to parameter types is a "maxPhase" setting to indicate that there is a further restriction on when parameters of a particular type can be changed. For example, in one implementation, in the data processing system 100, parameters of the "TableName" type are not meant to be changed anytime during or after deployment—this is because code or SQL expressions have been previously generated after the deployment preparation stage that refers to the TableName type. Thus, the "TableName" type can have a maxPhase setting of "DEPLOYMENT_PREPARATION" to indicate that any parameter of this type cannot be changed after the deployment preparation phase.

In one implementation, in the data processing system 100, a property type is introduced with the following XML text (in one implementation, the data processing system 100 uses Eclipse Modeling Framework (EMF) classes to introduce types into the data processing system).

```
<propertytype name="TableName" emfClassName="EString"
emfPkgUri="http://www.eclipse.org/emf/2002/Ecore" primitive="true"
defaultValueLiteral="">
<param usage="semantics" name="maxPhase"
value="DEPLOYMENT_PREPARATION"/>
</propertytype>
```

Accordingly, in one implementation, the data processing system 100 uses this additional type-specific attribute (or setting) in limiting the value of the "maxChangePhase" attribute that is permissible for a parameter that uses a given type. So, for example, if a parameter called "SalesTgtTable" is of type "TableName" (instead of a type "String"), then the highest value that a developer can set the "maxChangePhase" attribute for the "SalesTgtTable" parameter is "DEPLOYMENT_PREPARATION" (since, as discussed above, (in one implementation) parameters of the "TableName" type are not meant to be changed anytime during or after DEPLOYMENT. If the "SalesTgtTable" parameter were of type "String", then a developer could have set the "maxChangeValue" attribute of the parameter to any value up to "EXECUTION_INSTANCE". Accordingly, the additional attribute "maxphase" that is associated with a parameter type can further provide an additional mechanism for managing parameters in a data processing system.

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk read/write (CD-RJW) and DVD.

Figure 7:
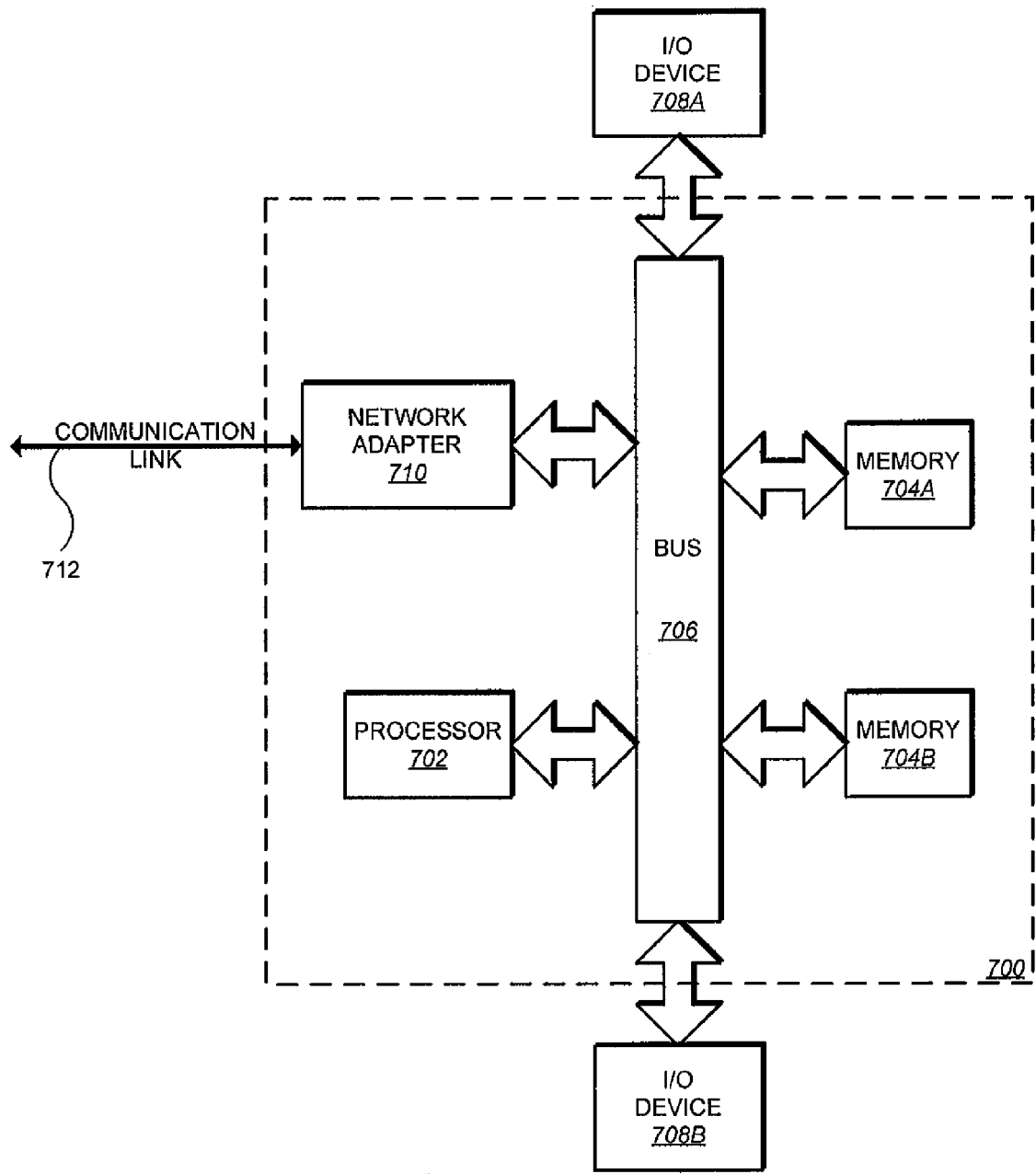
FIG. 7 is a block diagram of a data processing system suitable for storing and/or executing program code in accordance with one implementation of the invention.

FIG. 7 illustrates a data processing system 700 suitable for storing and/or executing program code. Data processing system 700 includes a processor 702 coupled to memory elements 704A-B through a system bus 706. In other embodiments, data processing system 700 may include more than one processor and each processor may be coupled directly or indirectly to one or more memory elements through a system bus.

Memory elements 704A-B can include local memory employed during actual execution of the program code, bulk storage, and cache memories that provide temporary storage of at least some program code in order to reduce the number of times the code must be retrieved from bulk storage during execution. As shown, input/output or I/O devices 708A-B (including, but not limited to, keyboards, displays, pointing devices, etc.) are coupled to data processing system 700. I/O devices 708A-B may be coupled to data processing system 700 directly or indirectly through intervening I/O controllers (not shown).

In one implementation, a network adapter 710 is coupled to data processing system 700 to enable data processing system 700 to become coupled to other data processing systems or remote printers or storage devices through communication link 712. Communication link 712 can be a private or public network. Modems, cable modems, and Ethernet cards are just a few of the currently available types of network adapters.

Various implementations for managing parameters of an application associated with a data processing system have been described. Nevertheless, various modifications may be made to the implementations described above, and those modifications would be within the scope of the present invention. For example, although the above techniques are described in the context of data processing applications and/ETL jobs, the techniques can be applied generally to a variety of other applications. Also, although the phases listed above are described in the context of lifecycle phases of an application, any suitable criteria may be used to demarcate a phase (or time period). Accordingly, many modifications may be made without departing from the scope of the present invention.

What is claimed is:

1. A computer-implemented method to manage value changes of parameters of an application in a data processing system, based on application phases and based further on restrictions specific to parameter types, the computer-implemented method comprising:

identifying a plurality of phases of the application in the data processing system, each phase corresponding to a time period during a lifecycle of the application;

identifying a plurality of parameters of the application, including a first parameter of a first parameter type and further including a second parameter of a second parameter type different from the first parameter type;

defining, in a parameter administration component of the data processing system, a first restriction attribute applicable to all parameters of the first parameter type and that specifies: (i) a first of the plurality of phases during which any parameter value of the first parameter type is permitted to change and (ii) a second of the plurality of phases during which any parameter value of the first parameter type is not permitted to change;

defining, in the parameter administration component, a second restriction attribute applicable to all parameters of the second parameter type and that specifies: (i) the second phase as a phase during which any parameter value of the second parameter type is permitted to change and (ii) a third of the plurality of phases during which any parameter value of the second parameter type is not permitted to change; and enforcing the first and second restriction attributes upon all parameters of the first and second parameter types, respectively, by the parameter administration component when executed by one or more computer processors, such that the first parameter of the first parameter type is permitted to be changed during the first phase and precluded from being changed during the second phase, and such that the second parameter of the second parameter type is permitted to be changed during the second phase and precluded from being changed during the third phase.

2. The computer-implemented method of claim 1, wherein the plurality of phases is identified based on user input.

3. The computer-implemented method of claim 1, wherein the plurality of phases is identified based on pre-defined settings.

4. A computer-implemented method to manage value changes of parameters of an application in a data processing system, based on application phases and based further on restrictions specific to parameter types, the computer-implemented method comprising:

receiving requests to change values of a plurality of parameters identified for the application in the data processing system, the plurality of parameters including a first parameter of a first parameter type and further including a second parameter of a second parameter type different from the first parameter type;

determining a current phase of a plurality of phases of the application and by a parameter administration component of the data processing system, the current phase corresponding to a time period during a lifecycle of the application; and changing the value of the first parameter upon determining, by the parameter administration component and based on a first restriction attribute applicable to all parameters of the first parameter type, that the current phase is within a permissible phase during which the value of the first parameter of the first parameter type is permitted to change;

precluding, by the parameter administration component when executed by one or more computer processors, the value of the second parameter from being changed, upon determining, based on a second restriction attribute applicable to all parameters of the second parameter type, that the current phase is not within any permissible phase during which the value of the second parameter of the second parameter type is permitted to change;

wherein the first restriction attribute specifies a first phase, other than the current phase, during which any parameter value of the first parameter type is not permitted to change, wherein the second restriction attribute specifies a second phase, other than the current phase, during which any parameter value of the second parameter type is permitted to change, wherein the first and second restriction attributes are enforced upon all parameters of the first and second types, respectively.

5. The computer-implemented method of claim 4, wherein the permissible phase during which the value of the first parameter of the first parameter type is permitted to change is selected from a design phase, a deployment preparation phase, a packaging phase, a deployment phase, an administration phase, or an execution instance phase.

6. The computer-implemented method of claim 4, wherein the permissible range of phases during which the value of the first parameter of the first parameter type is permitted to change is defined based on user input.

7. A computer program product, tangibly stored on a non-transitory computer-readable medium, for managing value changes of parameters of an application in a data processing system, based on application phases and based further on restrictions specific to parameter types, the computer program product comprising instructions executable to:

identify a plurality of phases of the application in the data processing system, each phase corresponding to a time period during a lifecycle of the application;

identifying a plurality of parameters of the application, including a first parameter of a first parameter type and further including a second parameter of a second parameter type different from the first parameter type;

define, in a parameter administration component of the data processing system, a first restriction attribute applicable to all parameters of the first parameter type and that specifies: (i) a first of the plurality of phases during which any parameter value of the first parameter type is permitted to change and (ii) a second of the plurality of phases during which any parameter value of the first parameter type is not permitted to change;

define, in the parameter administration component, a second restriction attribute applicable to all parameters of the second parameter type and that specifies: (i) the second phase as a phase during which any parameter value of the second parameter type is permitted to change and (ii) a third of the plurality of phases during which any parameter value of the second parameter type is not permitted to change; and enforce the first and second restriction attributes upon all parameters of the first and second parameter types, respectively, by the parameter administration component when executed by one or more computer processors, such that the first parameter of the first parameter type is permitted to be changed during the first phase and precluded from being changed during the second phase, and such that the second parameter of the second parameter type is permitted to be changed during the second phase and precluded from being changed during the third phase.

8. The computer program product of claim 7, wherein the plurality of phases are identified based on user input.

9. The computer program product of claim 7, wherein the plurality of phases are identified based on pre-defined settings.

10. A computer program product, tangibly stored on a non-transitory computer-readable medium, to manage value changes of parameters of an application in a data processing system, based on application phases and based further on restrictions specific to parameter types, the computer program product comprising instructions executable to:

receive requests to change values of a plurality of parameters identified for the application in the data processing system, the plurality of parameters including a first parameter of a first parameter type and further including a second parameter of a second parameter type different from the first parameter type;

determine a current phase of a plurality of phases of the application and by a parameter administration component of the data processing system, the current phase corresponding to a time period during a lifecycle of the application; and change the value of the first parameter upon determining, by the parameter administration component and based on a first restriction attribute applicable to all parameters of the first parameter type, that the current phase is within a permissible phase during which the value of the first parameter of the first parameter type is permitted to change;

preclude, by the parameter administration component when executed by one or more computer processors, the value of the second parameter from being changed, upon determining, based on a second restriction attribute applicable to all parameters of the second parameter type, that the current phase is not within any permissible phase during which the value of the second parameter of the second parameter type is permitted to change;

wherein the first restriction attribute specifies a first phase, other than the current phase, during which any parameter value of the first parameter type is not permitted to change, wherein the second restriction attribute specifies a second phase, other than the current phase, during which any parameter value of the second parameter type is permitted to change, wherein the first and second restriction attributes are enforced upon all parameters of the first and second types, respectivel.

11. The computer program product of claim 10, wherein the permissible phase during which the value of the first parameter of the first parameter type is permitted to change is selected from a design phase, a deployment preparation phase, a packaging phase, a deployment phase, an administration phase, or an execution instance phase.

12. The computer program product of claim 10, wherein the permissible range of phases during which the value of the first parameter of the first parameter type is permitted to change is defined based on user input.

13. A computer-implemented method to manage value changes of parameters of an application in a data processing system, based on application phases, user groups, and restrictions specific to parameter types, the computer-implemented method comprising:

determining a group associated with a first user of the application in the data processing system; and outputting, for display to the first user, a plurality of parameters identified for the group by a parameter administration component of the data processing system, the plurality of parameters including a first parameter of a first parameter type and further including a second parameter of a second parameter type different from the first parameter type;

wherein the first parameter type has a first restriction attribute applicable to all parameters specific to both the first parameter type and the group, the first restriction attribute specifying: (i) a first of the plurality of phases during which any parameter value of the first parameter type is permitted to be changed based on the group and (ii) a second of the plurality of phases during which any parameter value of the first parameter type is not permitted to be changed based on the group, wherein each of the plurality of phases corresponds to a respective time period during a lifecycle of the application;

wherein the second parameter type has a second restriction attribute applicable to all parameters specific to both the second parameter type and the group, the second restriction attribute specifying: (i) the second phase as a phase during which any parameter value of the second parameter type is permitted to be changed based on the group and (ii) a third of the plurality of phases during which any parameter value of the second parameter type is not permitted to be changed based on the group;

wherein responsive to a request from the first user to change the second parameter during the second phase, the second parameter is permitted by the parameter administration component to be changed;

wherein responsive to a request from a second user, not in the group, to change the second parameter during the second phase, the second parameter is precluded by the parameter administration component, when executed by one or more computer processors, from being changed;

wherein the first parameter is precluded by the parameter administration component from being changed, responsive to requests from each of the first and second users, respectively, during the second phase;

wherein the first and second restriction attributes are enforced by the parameter administration component upon all parameters specific to both the group and, respectively, the first and second parameter types.

14. A computer program product, tangibly stored on a non-transitory computer-readable medium, to manage value changes of parameters of an application in a data processing system, based on application phases, user groups, and restrictions specific to parameter types, the computer program product comprising instructions executable to:

determine a group associated with a first user of the application in the data processing system; and outputting, for display to the first user, a plurality of parameters identified for the group by a parameter administration component of the data processing system, the plurality of parameters including a first parameter of a first parameter type and further including a second parameter of a second parameter type different from the first parameter type;

wherein the first parameter type has a first restriction attribute applicable to all parameters specific to both the first parameter type and the group, the first restriction attribute specifying: (i) a first of the plurality of phases during which any parameter value of the first parameter type is permitted to be changed based on the group and (ii) a second of the plurality of phases during which any parameter value of the first parameter type is not permitted to be changed based on the group, wherein each of the plurality of phases corresponds to a respective time period during a lifecycle of the application;

wherein the second parameter type has a second restriction attribute applicable to all parameters specific to both the second parameter type and the group, the second restriction attribute specifying: (i) the second phase as a phase during which any parameter value of the second parameter type is permitted to be changed based on the group and (ii) a third of the plurality of phases during which any parameter value of the second parameter type is not permitted to be changed based on the group;

wherein responsive to a request from the first user to change the second parameter during the second phase, the second parameter is permitted by the parameter administration component to be changed;

wherein responsive to a request from a second user, not in the group, to change the second parameter during the second phase, the second parameter is precluded, by the parameter administration component when executed by one or more computer processors, from being changed;

wherein the first parameter is precluded by the parameter administration component from being changed, responsive to requests from each of the first and second users, respectively, during the second phase;

wherein the first and second restriction attributes are enforced by the parameter administration component upon all parameters specific to both the group and, respectively, the first and second parameter types.

15. A data processing system to manage value changes of parameters of an application, based on application phases, user groups, and restrictions specific to parameter types, the system comprising:

one or more computer processors; and a memory storing a parameter administration engine having a plurality of executable components executable on the one or more processors to perform an operation, the plurality of components including at least:

a first component to determine a group associated with a first user of the application of the data processing system; and a second component to output, for display to the first user, a plurality of parameters identified for the group, the plurality of parameters including a first parameter of a first parameter type and further including a second parameter of a second parameter type different from the first parameter type;

wherein the first parameter type has a first restriction attribute applicable to all parameters specific to both the first parameter type and the group, the first restriction attribute specifying: (i) a first of the plurality of phases during which any parameter value of the first parameter type is permitted to be changed based on the group and (ii) a second of the plurality of phases during which any parameter value of the first parameter type is not permitted to be changed based on the group, wherein each of the plurality of phases corresponds to a respective time period during a lifecycle of the application;

wherein the second parameter type has a second restriction attribute specific to both the second parameter type and the group, the second restriction attribute specifying: (i) the second phase as a phase during which any parameter value of the second parameter type is permitted by the parameter administration engine to be changed based on the group and (ii) a third of the plurality of phases during which any parameter value of the second parameter type is not permitted to be changed based on the group;

wherein responsive to a request from the first user to change the second parameter during the second phase, the second parameter is permitted by the parameter administration engine to be changed;

wherein responsive to a request from a second user, not in the group, to change the second parameter during the second phase, the second parameter is precluded by the parameter administration engine from being changed;

wherein the first parameter is precluded by the parameter administration engine from being changed, responsive to requests from each of the first and second users, respectively, during the second phase;

wherein the first and second restriction attributes are enforced by the parameter administration engine upon all parameters specific to both the group and, respectively, the first and second parameter types.

16. The data processing system of claim 15, wherein the plurality of executable components further includes:
a third component to identify a plurality of phases includes receiving user input identifying the plurality of phases of the application; wherein identifying a plurality of phases includes identifying the plurality of phases of the application based on pre-defined settings;
wherein the plurality of phases of the application includes: a design phase, a deployment preparation phase, a packaging phase, a deployment phase, an administration phase, and an execution instance phase.

17. The data processing system of claim 16, wherein the application includes a data flow, wherein the plurality of executable components further includes a fourth component to define an attribute of the parameter, wherein the attribute is indicative of, in respective instances, each of:
(i) whether the parameter is shareable among different jobs of an application;
(ii) that the value of the parameter is not changeable or is for meant for display purposes only;
(iii) whether the parameter requires a valid current value;
(iv) each job where the parameter is referenced; and
(v) the group to which the parameter belongs.

18. The data processing system of claim 17, wherein in a first instance, the application comprises a data integration job; wherein in a second instance, the application comprises an extract, transform and load (ETL) job;
wherein the operation is to generate an execution plan graph from the data flow, the operation comprising:
receiving a data flow, wherein the data flow includes operators and execution dependencies between the operators, each execution dependency specifying: (i) a first operator; (ii) and a second operator; and (iii) that the second operator is to execute only after the first operator has finished executing; and wherein the operators are supported by a plurality of runtime engine types;
in response to receiving the data flow, generating a metadata representation of the data flow to produce a logical operator graph.

19. The data processing system of claim 18, wherein the operation further comprises:
generating a set of code units from the metadata representation, wherein each code unit in the set of code units is executable on the plurality of runtime engine types; and
processing the set of code units to produce the execution plan graph; and
wherein generating the metadata representation comprises:
classifying the operators into groups according to the execution dependencies and the plurality of runtime engine types, wherein at least one of the groups comprises a sequence of operators in the data flow that is supported by a single runtime engine type, and wherein the operators are classified to preclude any circular execution dependency among the groups;
determining, based on the groups and the execution dependencies, an order in which to execute the groups; and
optimizing at least one of the groups based on the runtime engine type of the at least one of the groups.

20. The data processing system of claim 19, wherein processing the set of code units further comprises aggregating the set of code units to build a particular execution plan graph for each group, wherein the operation further comprises:
generating the set of code units for each group;
generating staging code for the staging terminals separating the groups; and
processing each operator in each of the groups, comprising:
resolving staging with neighboring operators;
generating a number of code units for each operator to form the set of code unit; and
placing the set of code units into the particular execution plan graph for each group.

21. The data processing system of claim 20, wherein the first restriction attribute is not specific to the second parameter type, wherein the second restriction attribute is not specific to the first parameter type, wherein the values of the first and second parameters provide arguments passed to the application when the application is executed, wherein each of the first and second parameter types is selected from an integer type, a string type, and a user-defined type, wherein the first, second, and third phases are distinct phases, wherein the operation further comprises:
aggregating the particular execution plan graph for each group into the execution plan graph; and
performing post-aggregation processing.

22. The data processing system of claim 21, wherein processing the set of code units further comprises:
generating deployment code for preparing one or more runtime engines for execution of the execution plan graph;
generating run code for executing the execution plan graph; and
generating un-deployment code for undoing the effects of the deployment code.

23. The data processing system of claim 22, wherein the operation further comprises:
executing the execution plan graph, wherein each of the groups is executed by one of the plurality of different types of runtime engines associated with the groups;
adding at least one new runtime engine for executing the execution plan graph;
establishing a group definition for each group; and
establishing an operator definition for each operator.

* * * * *